May 9, 1967  A. R. BIGLER  3,318,469
EXTENSIBLE CARRIER FOR A PARKING APPARATUS
Original Filed March 22, 1963  7 Sheets-Sheet 1

INVENTOR.
ALLEN R. BIGLER
BY
BUCKHORN, BLORE, KLARQUIST & SPARKMAN
ATTORNEYS

FIG. 5
FIG. 6

INVENTOR.
ALLEN R. BIGLER
BY
BUCKHORN, BLORE, KLARQUIST, & SPARKMAN
ATTORNEYS

May 9, 1967   A. R. BIGLER   3,318,469
EXTENSIBLE CARRIER FOR A PARKING APPARATUS
Original Filed March 22, 1963   7 Sheets-Sheet 4

INVENTOR.
ALLEN R. BIGLER
BY
BUCKHORN, BLORE, KLARQUIST & SPARKMAN
ATTORNEYS

FIG. 14

INVENTOR.
ALLEN R. BIGLER
BY
BUCKHORN, BLORE, KLARQUIST & SPARKMAN
ATTORNEYS

FIG. 15

United States Patent Office 3,318,469
Patented May 9, 1967

3,318,469
EXTENSIBLE CARRIER FOR A PARKING APPARATUS
Allen R. Bigler, 6210 E. Burnside, Portland, Oreg. 97215
Continuation of application Ser. No. 267,090, Mar. 22, 1963. This application Mar. 19, 1965, Ser. No. 443,776
8 Claims. (Cl. 214—95)

This is a continuation of my copending application Ser. No. 267,090, filed Mar. 22, 1963, for "Parking Apparatus."

This invention relates to an automobile parking apparatus and more particularly to a multi-tiered automobile parking facility.

An object of the invention is to provide an extensible automobile carrying apparatus adapted to travel under an automobile lengthwise of the automobile and powered for lift by a hydraulic drive completely contained by the carrier apparatus.

Another object of the invention is to provide a positively driven, extensible carrier which is adapted to travel longitudinally under an automobile and is rapidly extensible and contractible to fit the carrier to automobiles of different sizes.

Still another object of the invention is to provide a rugged, compact, positively driven extensible carrier.

A further object of the invention is to provide an extensible carrier having a minimum number of relatively movable parts.

The invention provides an automobile parking apparatus including a quill extensible to and from an elevator platform, together with an elongated carrier which is telescopically mounted on the quill and is moved relative to the quill to travel under an automobile to be carried thereby. The carrier includes an elongated cage, on one end of which is fixed a so-called crab, and on the other end of which is mounted a second crab which is movable relative to the cage and the first crab. Each of the crabs carries two pairs of cardle arms on opposite sides thereof for engaging one pair of wheels of an automobile. The crabs carry lift rollers which serve to lift the crabs together with an automobile engaged by the cradle arms of the crabs and to transport the automobile to and from the elevator platform. Preferably, one of the crabs is fixed to one end of the cage and the other crab is movable relative to the cage by a pair of elongated lead screws rotated by a hydraulic motor carried by the cage. The lead screws engage nuts on the movable crab and move the crab along the cage, the cage being provided with guide rails for the movable crab.

A complete understanding of the invention may be obtained from the following detailed description of an automobile parking apparatus forming a specific embodiment thereof, when read in conjunction with the appended drawings, in which.

Referring now in detail to the drawings, FIGS. 1 to 4 illustrate the loading of an automobile on a parking apparatus forming one embodiment of the invention. The parking apparatus includes a hoist or elevator platform 20, which may be moved vertically and horizontally to align the upper surface of the platform with floors 22 of parking stalls positioned in horizontal rows at different levels. A suitable arrangement and construction of the hoist or elevator mechanism for moving and elevating the platform 20 is disclosed in my patent 2,916,166 and is adapted to move the platform 20 under the control of the operator to any desired level and horizontally along the floors 22 to any desired stall. In any given position of the platform 20, space permitting, it is of course desirable to have stalls at both ends of the platform 20.

The parking apparatus of the invention includes a carrier 23, which includes a crab 24 fixed to an inverted channel or cage 26 and a movable crab 28 carried movably by the cage 26. The crab 24 carries a pair of extensible cradle arms 30 and a second pair of extensible cradle arms 32 for engaging wheels 34 of an automobile to be picked up and carried by the carrier 23. The movable crab 28 includes pairs of cradle arms 36 and 38 adapted to cradle under the other pair of wheels 40 of the automobile.

Figure 15:
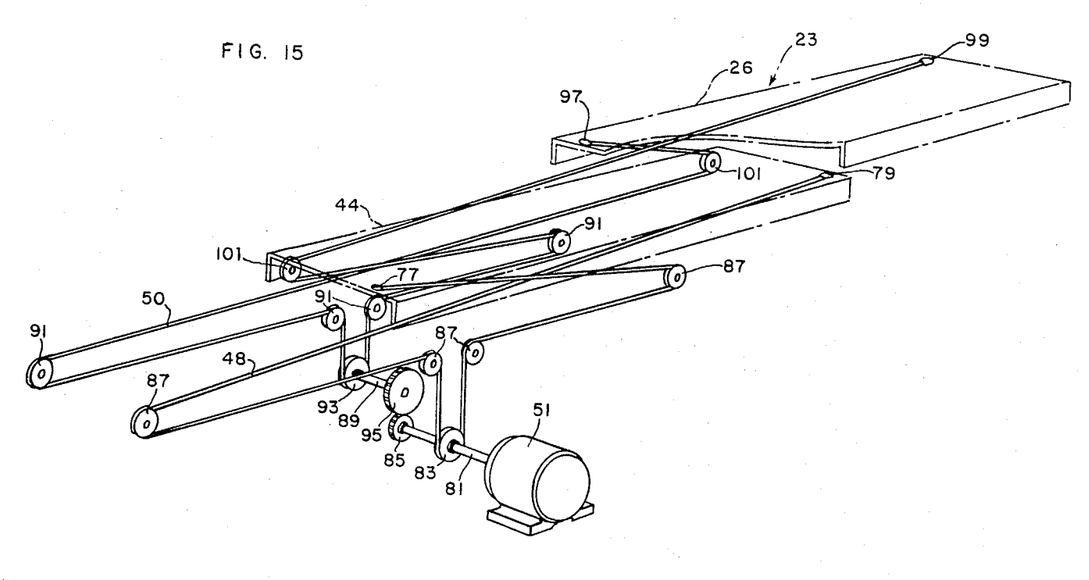
FIG. 15 is a schematic view of a carrier extending and contracting drive of the parking apparatus of FIG. 1.

The platform 20 carries a trackway 42 extending therealong. A quill 44 is guided by the trackway 42 and the carrier 23 is telescopically mounted on the quill 44. The parking apparatus includes a quill-and-cage drive includings chains 48 and 50 which is shown in FIG. 15 and is similar to that shown in my copending application Ser. No. 224,005, filed Sept. 17, 1962, the ends of the chain 48 being fixed to opposite end portions of the quill and the ends of the chains 50 being fixed to opposite end portions of the cage 26. The chains are driven by a motor 51 (FIG. 13) to move the quill 44 (FIG. 1) from a travel position contained wholly between the ends of the elevator platform 20 to a pickup position either to the right or the left of the platform 20, as viewed in FIG. 1. Simultaneously with the drive of the quill, the chain 50 drives the cage 26 relative to the quill in the same direction that the quill is being driven to an extreme position in which only short portions of the cage 26 and the quill overlap. The drive of the carrier 23 relative to the quill is never far enough to have the crab 28 beyond the quill in travel to the right beyond the platform 20, as viewed in FIG. 1, or to have the crab 24 beyond the quill in travel to the left beyond the platform 20.

The crab 28 may be driven along the cage 26 to position it closer to or farther from the crab 24, which is fixed relative to the cage 26. The crabs 24 and 28 are substantially identical in construction except for the mechanism for driving the crab 28 along the cage 26, and, for the sake of simplicity, only the crab 28 will be described in detail. The cage 26 (FIGS. 5 and 6) includes a pair of side, angle iron, members 60 to which is fastened, at the tops thereof, a top plate 62. The members 60 carry guide rails or bars 64, see FIGS. 11 and 12, extending therealong for guiding the crab 28 in its movement therealong, by means of bars 66 fixed to side, angle iron, members 68, which extend the entire length of the crab 28. The members 68 form a part of a rigid crab frame generally of the shape of an inverted U or inverted channel adapted to telescope over the quill 44 and fitting beneath the plate 62. Crossframe members 60 are secured rigidly to the members 68 at the ends thereof to form a rigid framework with the members 68. The crab 28 also includes inner, longitudinal angle iron members 72 connected rigidly at their ends to the crossframe members 70. Crossframe members 74 (FIG. 12) are secured at lower ends thereof to the side flanges of the side angle iron members 68 and have raised central portions 76 to provide clearance for the quill 44 and also to act as a support for the central portion of the top plate 62 of the cage 26. The members 72 are rigidly secured by welding or brazing to the raised central portions of the members 74. Longitudinal vertical plate members 80 (FIGS. 11 and 12) are welded to the angle iron members 68 and the crossframe members 70.

Figure 11:
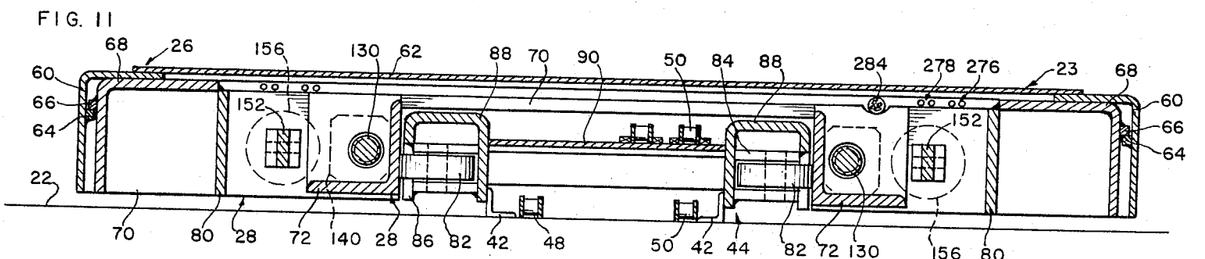
FIG. 11 is an enlarged, vertical section taken along line 11—11 of FIG. 5.
Figure 12:
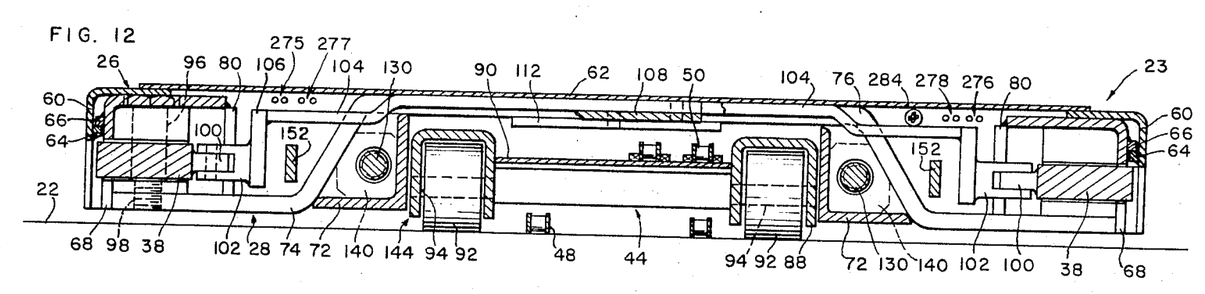
FIG. 12 is an enlarged, vertical section taken along line 12—12 of FIG. 5.

The members 72 act as a track or guideway for the crab 28 relative to the quill 44, as illustrated best in FIG. 11. Side rollers 82 are mounted on brackets 84 of the quill 44 and project through openings 86 in channels 88 of the quill to engage the vertical flanges of the members 72. The rollers 82 provide for easy, low friction movement of the crab 28 relative to the quill 44 while permitting the crabs 24 and 28 to be elevated relative to the quill. Members similar to the members 72 (not shown) are provided on the crab 24 for guiding the crab 24 on the quill 44 when the crab 24 is in a retracted position overlapping the quill. The rollers 82 are mounted in pairs spaced along the entire length of the quill 44. The quill includes, in addition to the channels 88, a top plate 90 joining the two channels 88 integrally together. The quill also includes rollers 92 (FIG. 12) rotatable in the channels 88 and supporting the quill on the floor 22 and the platform 20. The rollers 92 are mounted in pairs spaced along the length of the quill 44. Pins or axles 94 mount the rollers 92 in the channels 88.

The chain drive for extending and retracting the quill 44 relative to the elevator platform 20 and simultaneously extending and retracting the carrier 23 relative to the quill is shown schematically in FIG. 15. The chain drive includes the motor 51, a shaft 81 driven by the motor, a drive sprocket 83 and gear 85 driven by the shaft 81 and guide sprockets 87 rotatably mounted on the platform 20 on axes fixed relative to the platform. The motor 51 and shaft 81 are mounted on the platform, and drive the chain 48 selectively in either direction to move the quill in the selected direction relative to the platform. Connections 77 and 79 secure the ends of the chain 48 to the ends of the quill. The platform also mounts rotatably on fixed axes relative thereto a shaft 89 and guide sprockets 91 for the chain 50 which is driven by a drive sprocket 93 keyed to the shaft 89. The shaft 89 is driven by the shaft 81 through gears 85 and 95. Connections 97 and 99 fix the ends of the chain 50 to the ends of the cage 26, and guide sprockets 101 for the chain 50 are mounted on opposite ends of the quill 44 rotatably on axes fixed relative to the quill. When the motor 51 is actuated to drive the shaft 81 clockwise as viewed in FIG. 51, the quill 44 is driven to the right relative to the platform and the cage 26 is driven to the right relative to the quill. When the motor 51 is actuated reversely, the quill is driven to the left relative to the platform and the cage is driven to the left relative to the quill.

The cradle arms 36 and 38 (FIGS. 5, 6 and 12) are mounted pivotally on the end portions of the crossframe members 74 by pins 96 threaded into tapped bores 98 formed in the crossframe members 74. Lugs 100 on the cradle arms are pivotally connected to clevis portions 102 of links 104 having angularly depending end portions 106 carrying the clevis portions 102. The upper and inner ends of the links 104 are connected to a crank plate 108 mounted pivotally on pin 110 carried by bracket 112 fixed to the crossframe member 74. Links 114 are connected pivotally to the crank plates 108 and to levers 116 pivotally mounted on pins 118 carried by brackets 120 fixed to the side members 68. Pins 122 connect the levers 116 to piston rods 124 and 125 connected to pistons 121 and 123 (FIG. 14) mounted in hydraulic cylinders 126 and 127. The cylinders 126 and 127 are mounted pivotally by pins 128 (FIG. 5) carried by brackets 130 fixed to the side angle iron members 68 and the longitudinal members 80. Hydraulic fluid introduced into the pivoted end of the cylinder 126 extends the piston rod 124 to rotate the lever 116 in a clockwise direction, as viewed in FIG. 5. This rotates the crank plate 108 clockwise to pull the arms 36 from their extended or operative positions back to their retracted or folded positions lying inside the cage 26. Similarly, when hydraulic liquid is introduced into the free or righthand end of the cylinder 126, as viewed in FIG. 5, the piston rod 124 is retracted into the cylinder 126 to drive the lever 116 in a counterclockwise direction to drive the crank plate 108 in a counterclockwise direction and extend the arms 36 to their operative or extended positions.

Figure 5:
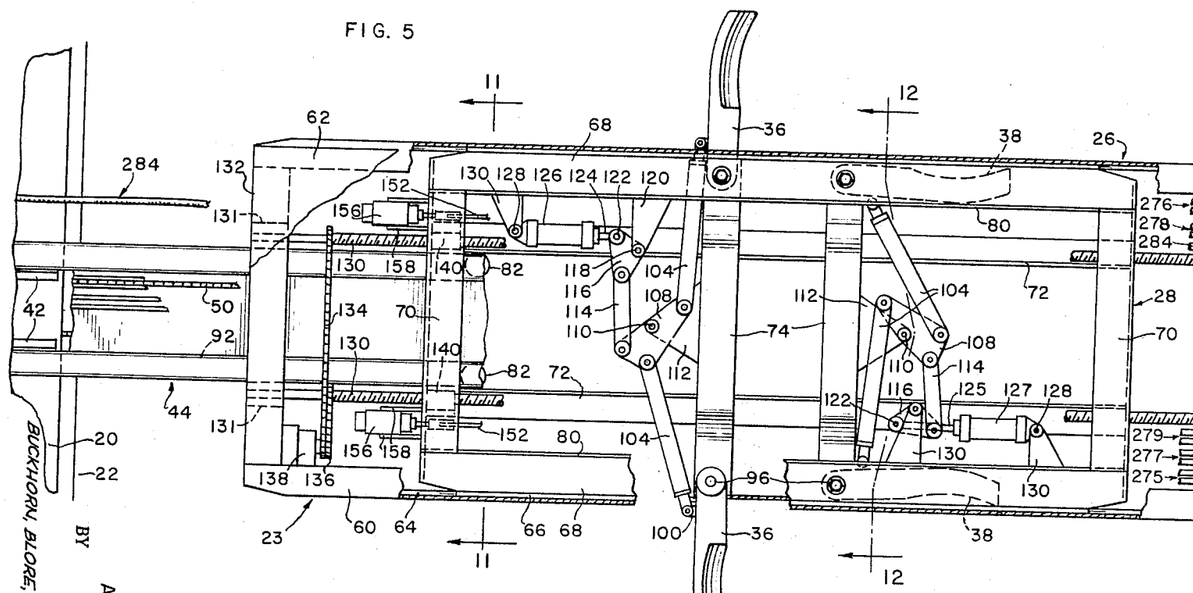
FIG. 5 is an enlarged top plan view of a part of the automobile parking apparatus of FIG. 1 with portions thereof broken away and shown in section to more clearly illustrate the invention.
Figure 6:
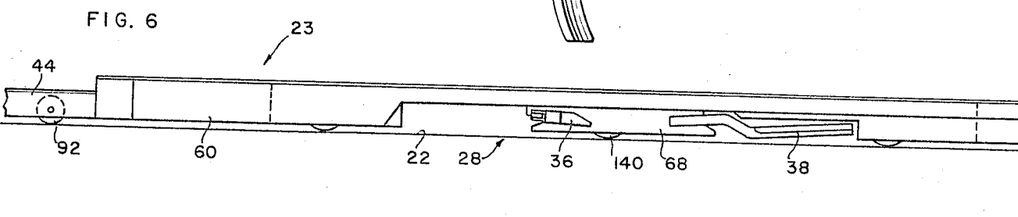
FIG. 6 is a side elevation of the apparatus shown in FIG. 5.
Figure 7:
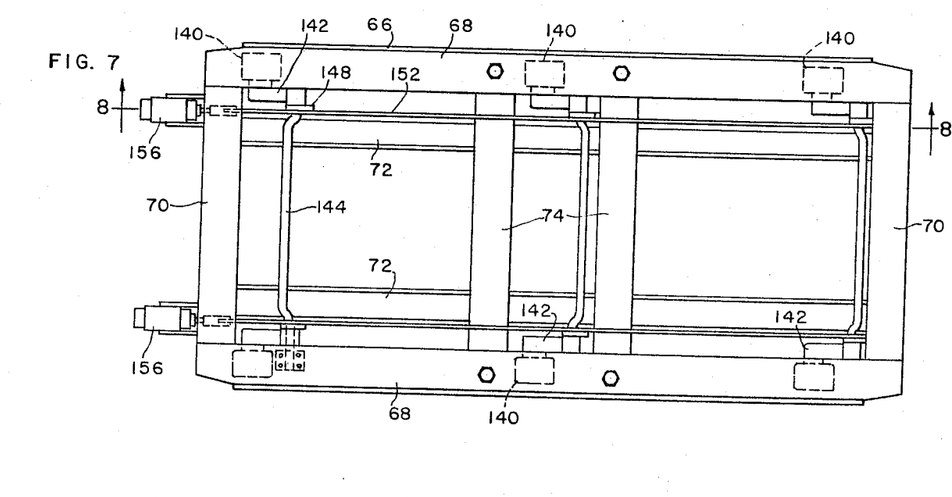
FIG. 7 is a top plan view of a portion of the apparatus shown in FIG. 5.

In order to move the crab 28 along the cage 26, there is provided rotatably on the cage 26 a pair of lead screws 130 journaled by radial and thrust bearings 131 in a rigid end frame member 132 forming an integral part of the cage. The lead screws are driven through chain drives 134 and 136 which are driven in turn by a hydraulic motor 138. The screws 130 are threaded through nuts 140 fixed to one of the cross frame members 70 of the crab 28. When the motor 138 is driven in one direction, it will drive the lead screws 130 to move the crab 28 to the right, as viewed in FIG. 5, relative to the cage 26. When the motor 138 is driven in the opposite direction, it will rotate the screws 130 to move the crab 28 to the left relative to the cage 26. The cage 24 is fixed by bolts, screws, brazing or the like to the end of the cage 26 remote from the crab 28, and the crab 28 is moved closer to or farther from the crab 24 depending on the direction of rotation of the lead screws 130. The righthand ends of the lead screws 130, as viewed in FIG. 5, are journaled in suitable bearing members (not shown) carried by the cage 26 near the lefthand end of the crab 24, as viewed in FIG. 1.

Figure 8:
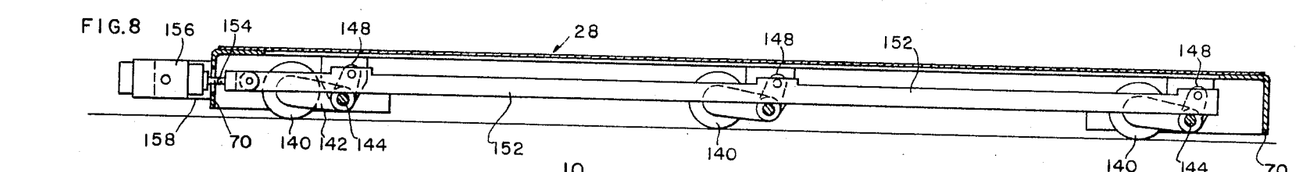
FIG. 8 is an enlarged vertical section taken along line 8—8 of FIG. 7.

Each of the crabs 24 and 28 is provided with lift rollers 140 (FIGS. 8, 9 and 10) carried rotatably by axles 141 mounted on crank arms 142 keyed to crank shaft 144. Normally, the rollers 140 are in their retracted positions supporting the crabs in their positions only slightly raised from the floor, as illustrated best in FIG. 8. The crankshafts are journaled in brackets 146. Actuating arms 148 also are keyed to the ends of the crank shaft 144, and are connected pivotally by pins 150 to actuating bars 152 connected pivotally to piston rods 154. The piston rods are operable by hydraulic cylinders 156 through pistons 157 (FIG. 14) secured to the ends of the rods 154 to swing the arms 148 in a counterclockwise direction, as viewed in FIGS. 8 and 9, to project the rollers 140 farther out of the crab to lift the crabs 24 and 28 farther from the floor. The cylinders 156 are mounted by brackets 158 (FIG. 5) on one of the members 70 of the crab 28. When the rollers 140 are moved to their projected or operative positions to lift the crabs 24 and 28, the crabs lift the automobile whose wheels are angaged by the cradle arms of the crabs and the rollers 140 support the crabs and cage 26 together with the automobile in lifted positions for transportation to and from the elevator platform 20.

Figure 13:
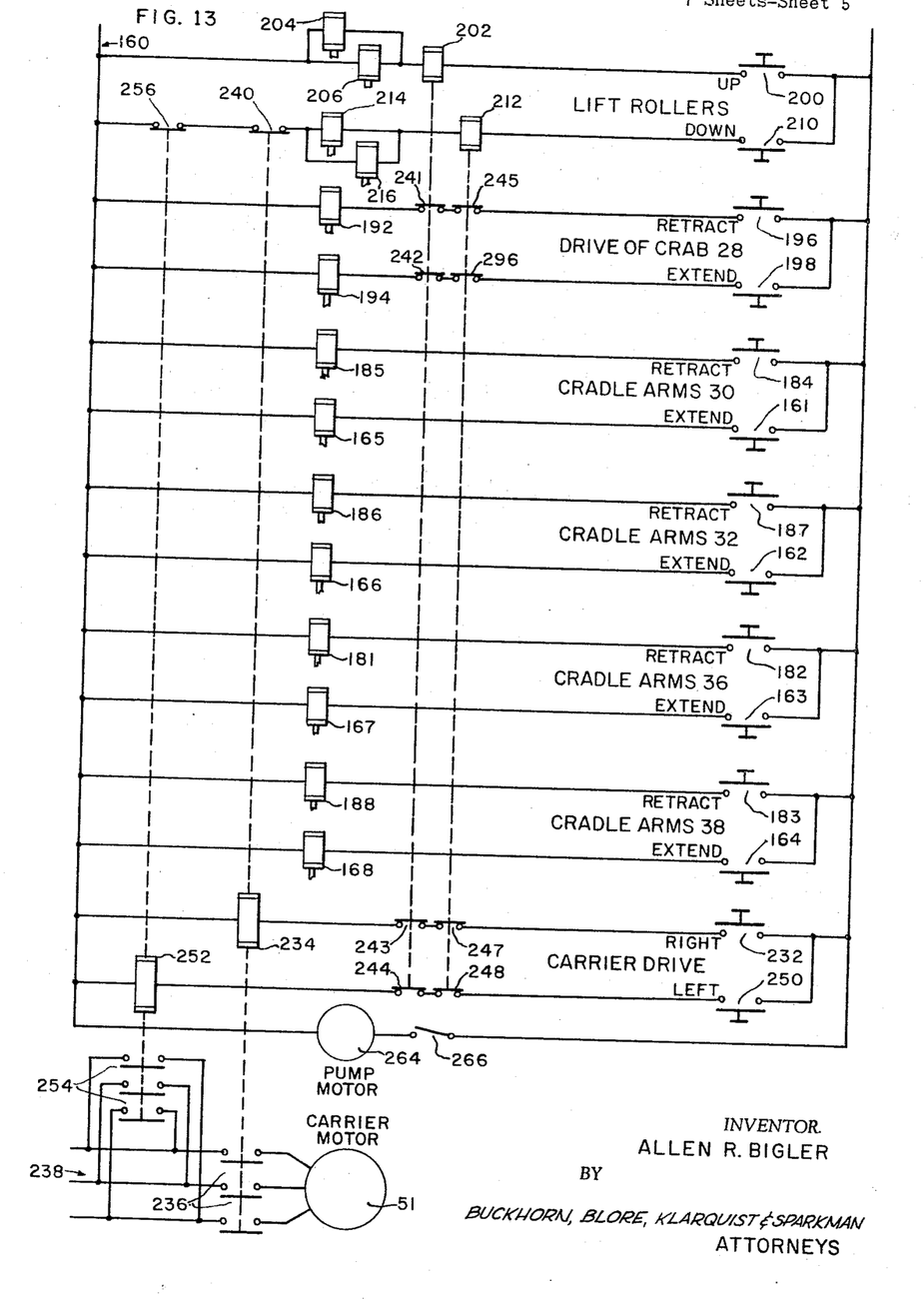
FIG. 13 is a diagrammatic view of an electrical control circuit of the parking apparatus of FIG. 1.
Figure 14:
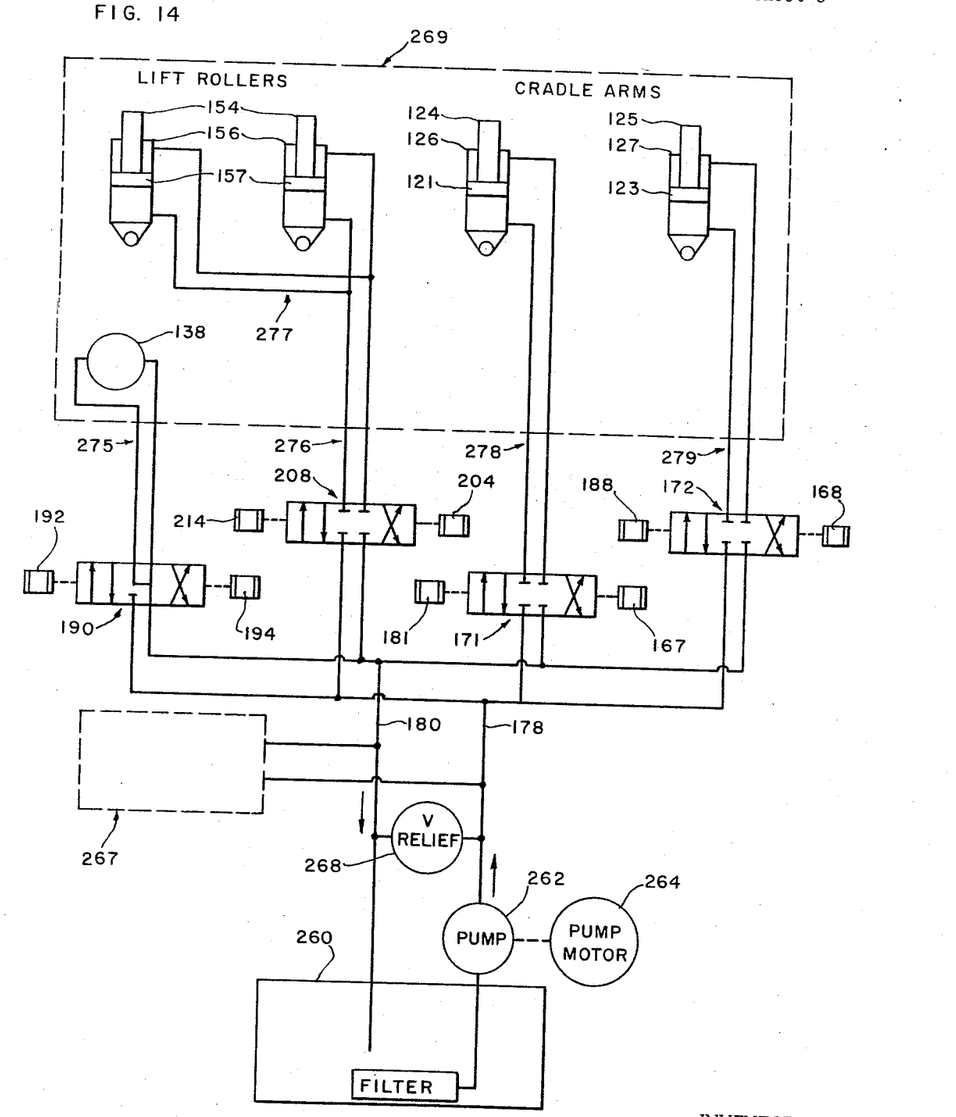
FIG. 14 is a schematic view of a hydraulic system of the parking apparatus of FIG. 1.

The electrical control circuit is shown in FIG. 13, and includes a control powerline 160 and momentary switches 161 to 164 operable manually and individually to energize valve solenoids 165 to 168, respectively, to extend the cradle arms 30, 32, 36 and 40 (FIG. 4), respectively. Momentary actuation of the solenoids 165 to 168 actuates their respective valves, of which valves 171 and 172 are shown in FIG. 14. The valves of which the solenoids 165 and 166 form a part are associated with the crab 24 and, being identical with the valves 171 and 152, are not shown. Assuming that it is wished to extend the cradle arms 36, the operator, who is located on the platform 20 (FIG. 1), closes the switch 163 (FIG. 13) momentarily to momentarily energize the winding of the solenoid 167. This actuates the valve 171 (FIG. 14) to connect a pressure line 178 to the upper or free end of the cylinder 126 to pull in the piston rod 124 to move the cradle arms 36 (FIG. 5) to their extended positions, and connects the lower end of the cylinder 126 to an exhaust line 180. The valve 171 remains in this condition until the solenoid 181 is actuated momentarily to reverse the condition of the valve 171. The energization or actuation of the solenoid 181 is controlled by a momentary switch 182 (FIG. 13), and when the solenoid 181 is actuated momentarily it causes the valve 171 (FIG. 14) to shift to connect the pressure line 178 to the lower end of the cylinder 126 and the exhaust line 180 to the upper end of the cylinder 126. This causes the piston rod 124 to be extended farther out of the piston 126 and moves the cradle arms 36 (FIG. 5) back to their folded or retracted positions. The valve 172 (FIG. 14) is controlled in the same manner by the momentary switch 164 (FIG. 13) and a momentary switch 183 controlling solenoid 188. Similarly, the switches 161 and 162 control the solenoids 165 and 166 to actuate valves (not shown) of the crab 24 corresponding to the valves 171 and 172. Retract switches 184 and 187 of the momentary type control the energization of solenoids 185 and 186, respectively, forming parts of the valves (not shown) which include the solenoids 165 and 166.

The hydraulic motor 138 (FIGS. 5 and 14) is controlled by a valve 190 which includes solenoids 192 and 194, whose energization is controlled by momentary switches 196 and 198 (FIG. 13), respectively. To drive the crab 28 in a direction toward the crab 24, the switch 196 is closed by the operator on the platform 20 to energize the solenoid 192. Then, so long as the switch 196 is held closed to keep the solenoid 192 energized, the valve 190 is in a condition in which the lines 178 and 180 are connected to the hydraulic motor 138 so as to drive the motor 138 in a direction driving the screws 130 (FIG. 5) to move the crab 28 toward the crab 24. When the crab 28 reaches the desired position the operator releases the switch 196 (FIG. 13), which opens to drop out the solenoid 192 and the valve 190 (FIG. 14) returns to its center or neutral position in which both sides of the motor 138 are connected to the exhaust line 180 and the crab 28 (FIG. 5) is held in this adjusted position relative to the cage 26 and crab 24.

To move the crab 28 away from the crab 24 the switch 198 (FIG. 13) is closed to actuate the solenoid 194. The solenoid 194 actuates the valve 190 (FIG. 14) to a condition connecting the hydraulic motor 138 to the lines 178 and 180 to drive the lead screws 130 (FIG. 5) in a direction such as to move the crab 28 away from the crab 24. When the desired position is reached the operator releases the switch 198 (FIG. 13) and the switch 198 opens. This drops out the solenoid 194 and the valve 190 (FIG. 14) returns to neutral position to hold the crab 28 in this adjusted position relative to the cage 26 and the crab 24.

To drive the lift rollers 140 (FIGS. 8 and 9) of both of the crabs 24 and 28 downwardly to their operative or lifting positions, the operator closes a momentary switch 200 (FIG. 13). This energizes a relay winding 202 and windings of solenoids 204 and 206. Actuation of the solenoid 204 momentarily actuates a valve 208 (FIG. 14) of a known type to retract the piston rods 154 to push the rollers 140 downwardly to their lifting positions. The solenoid 206 simultaneously actuates the lifting mechanism (not shown) of the crab 24 to lift the crab 24. To retract the lift rollers 140 and lower the cage 26 and the crabs 24 and 28, a momentary switch 210 (FIG. 13) is closed to energize relay winding 212 and actuate solenoids 214 and 216. The solenoid 214 is a portion of the valve 208 and the solenoid 216 is a portion of the valve (not shown) corresponding to the valve 208 but forms a portion of the control carried by the crab 24. Energization of the solenoid 214 changes the condition of the valve 208 to connect the pressure line 178 to the lower ends of the cylinders 156 to extend the piston rods 154 to pivot the crank arms 142 (FIGS. 8 and 9) carrying the rollers 140 to the retracted positions thereof, which lowers the crabs 24 and 28 to, of course, also lower the cage 26.

The drive of the chains 48 and 50 (FIG. 15) is effected by the carrier motor 51 carried by the platform 20. To drive the carrier 23 to the right, as viewed in FIG. 1, a momentary switch 232 (FIG. 13) is closed by the operator. Closing of the switch 232 energizes relay winding 234 to close contacts 236 to connect a power line 238 to the motor 230. This drives the motor in a direction moving quill 22 (FIG. 15) and the carrier 23 to the right to extend the quill and the carrier. Energization of the relay winding 234 also breaks contacts 240 to prevent lowering of the crabs 24 and 28 while the carriage is being operated. To drive the carrier motor 51 in the opposite direction, a momentary switch 250 is closed to energize relay winding 252 to close contacts 254 and open contacts 256. Closing of the contacts 254 drives the motor 51 in the reverse direction to move the quill and carrier to the left, as viewed in FIG. 1. Opening of contacts 256 (FIG. 13) prevents lowering of the carrier while the carrier motor 51 is operating to drive the carrier.

Whenever the cage 26 and crabs 24 and 28 are being either raised or lowered by closing the switch 200 or the switch 210 to energize the relay winding 202 or the relay winding 212, either contacts 241 to 244 are opened or contacts 245 to 248 are opened. Opening of the contacts 243, 244, 247 and 248 prevents energization of the relay windings 234 and 252 and prevents operation of the carrier motor 51 while the carrier is being lifted or lowered. The contacts 241, 242, 245 and 246 are provided to prevent movement of the crab 28 relative to the crab 24 while the crabs are being lifted or lowered.

Figure 1:
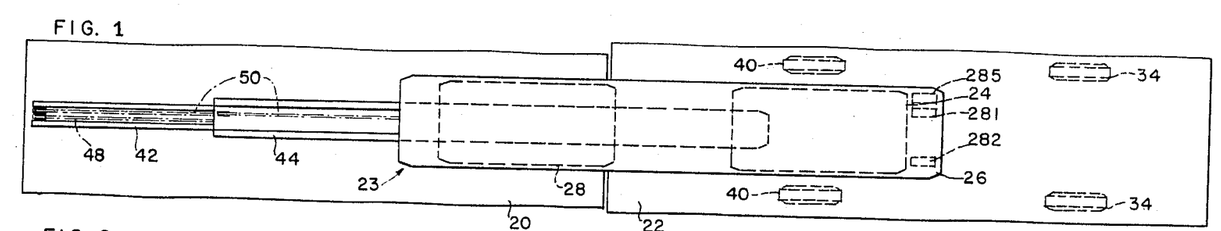
FIGS. 1 to 4 are schematic top plan views of an automobile parking apparatus forming one embodiment of the invention with the apparatus shown progressively in different positions while picking up an automobile preparatory to transporting the automobile.

The hydraulic system (FIG. 14) includes a reservoir 260 carried by the crabs 24. Hydraulic liquid is pumped from the reservoir by a pump 262 driven by a pump motor 264. The pump 262 and motor 264 also are carried by the crab 24. The pump motor 264 is controlled by a toggle switch 266 (FIG. 13) under the control of the operator on the platform 20 (FIG. 1). A pressure relief bypassing valve 268 (FIG. 14) is provided for preventing excess pressure in the pressure line 178. Normally, the operator closes the switch 266 at the start of the operation of the apparatus, and the switch 266 is left closed throughout the operation of the apparatus. A block 267 (FIG. 14) is shown to indicate the hydraulic system for controlling the crab 24 which includes elements corresponding to all the elements of the hydraulic system 269 carried by the crab 28 and the controlling valves and solenoids therefor except the valve 190 and motor 138. Only the hydraulic system 269 is carried by the crab 28, and the rest of the hydraulic elements including the reservoir 260, pump 262, pump motor 264, hydraulic system 269 and valves 171, 172, 190, 208 and 268 are carried by the cage 26 and crab 24 with extensible pairs of conduits 275 to 279 extending from housings 281 and 282 (FIG. 1) on the cage to the elements of the system 269 (FIG. 14). The housings 281, 282 and 285 house the reservoir 260, the pump motor 264, the pump 260 and all the valves of the entire hydraulic system. An electrical cable 284 carried on a spring-retracting reel (not shown) on the platform 20 (FIG. 5) extends along the cage 26 to one side of the quill 22 and the crabs 24 and 28 to a housing 285. The cable 284 carries the control and power conductors of the electrical circuit of FIG. 13 from the switches located on the elevator platform to the electrical elements on the cage 26.

Figure 2:
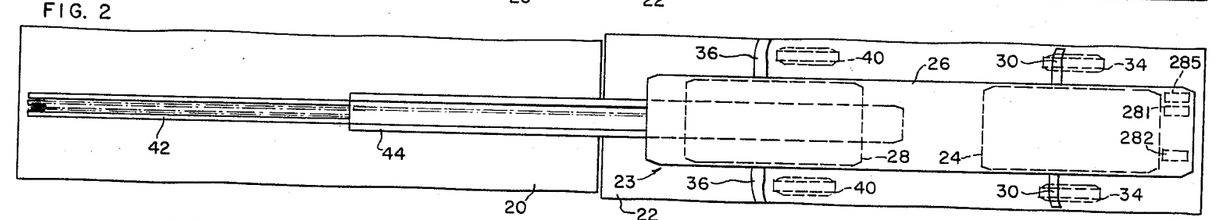
Figure 3:
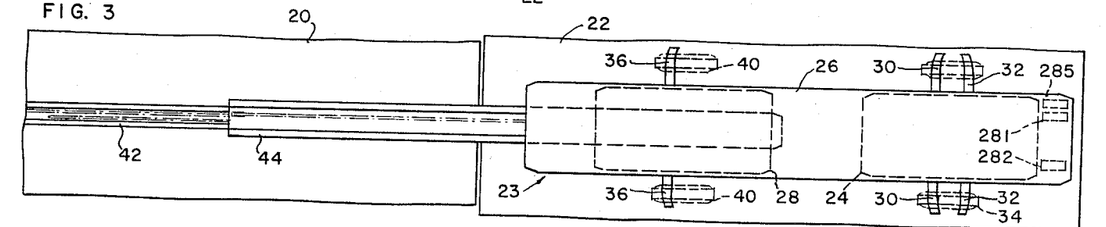
Figure 4:
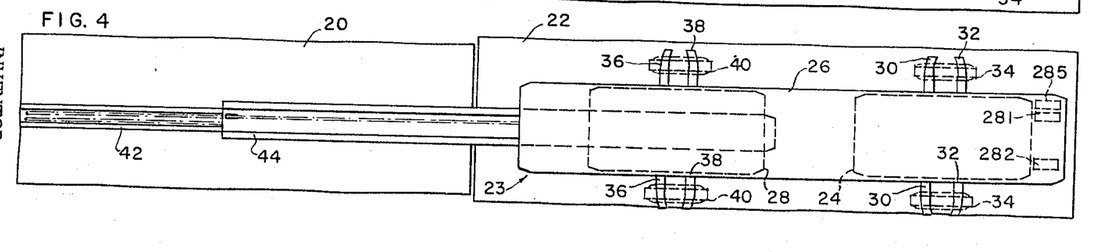

In operation of the apparatus described above, the platform 20 (FIG. 1) is positioned by its carrying structure where desired at the level of a particular parking stall (FIG. 1. The cradle arms 30, 32, 36 and 38 are retracted at this time and the carrier 23 is in its lower or unraised position. Assuming the switch 266 (FIG. 13) has been closed, the operator closes the momentary switch 232 to move the quill 44 to the right, as viewed in FIG. 1, and move the carrier 23 to the right relative to the quill 44 under the automobile which has the near wheels 40 and the remote wheels 34. After the crab 24 has passed the near wheels 40, the operator closes the switches 161 and 163 to extend the cradle arms 30 and 36, meanwhile keeping the switch 232 closed so that the carrier 23 (FIG. 2) continues to travel under the automobile. Preferably before the cradle arms 30 arrive in engagement with the wheels 34, the operator closes the switch 196 (FIG. 13) to energize the solenoid 192 to actuate the valve 190 (FIG. 14) to drive the motor 138 in a direction driving the crab 28 toward the crab 24, assuming the crab 28 to be separated from the crab 24 farther than suitable for picking up the particular automobile. The cradle arms 30 move into engagement with the wheels 34, as illustrated in FIG. 2. The operator then releases the switch 232 (FIG. 14) to the motor 230, and the carrier 23 is not driven further from the platform. However, the operator maintains the switch 196 closed to cause the crab 28 to continue to move toward the crab 24 until the cradle arms 36 engage the wheels 40 of the automobile, as illustrated in FIG. 3. Meanwhile, the operator closes the switch 162 momentarily to cause the cradle arms 32 to swing into extended positions engaging the wheels 34 and bracketing the wheels 34 with the cradle arms 30. After the arms 36 engage the wheels 40 the operator closes the switch 164 (FIG. 14) momentarily to energize the solenoid 168 to extend the cradle arms 38 to the positions illustrated in FIG. 4. The carrier now is in condition to lift and transport the automobile.

Figure 9:
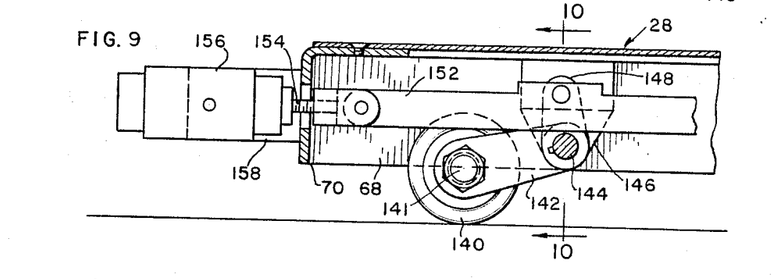
FIG. 9 is an enlarged, fragmentary, vertical section showing one end of the structure shown in FIG. 8 with the parts thereof in elevated positions.
Figure 10:
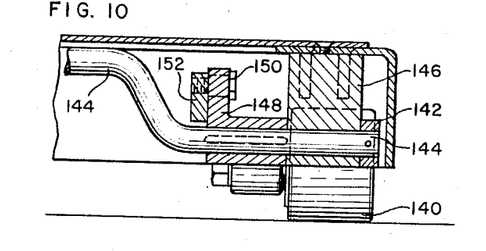
FIG. 10 is a fragmentary vertical section taken along line 10—10 of FIG. 9.

To lift the carrier, the switch 200 (FIG. 13) is closed momentarily to set the valve 208 (FIG. 14) to actuate the cylinders 156 of the crab 28 and the corresponding cylinders (not shown) of the crab 24 to move the rollers 140 (FIGS. 8 and 9) from their retracted positions to their lifting or extended positions, as illustrated in FIG. 9. This lifts the carrier 23 to a raised position above the floor 22 of the parking stall. The operator then closes switch 250 (FIG. 13) to actuate the motor 230 to move the raised carrier with the automobile carried thereby back onto the platform 20, after which the operator releases the switch 250. The carrier is maintained in its raised position on the platform 20, and the platform 20 is raised or lowered as desired and/or moved horizontally to a discharge station, or to another parking stall in case the position of the particular automobile is desired to be shifted. The operator then runs the carrier off the platform onto the discharge station or the parking stall and the switch 210 is actuated to cause the carrier to be lowered, after which the switches 182, 183, 184 and 187 are closed momentarily to retract the several cradle arms, and the carrier motor 51 then is actuated to pull the carrier back out from under the automobile onto the platform 20.

To move the carrier 23 (FIG. 1) to the left of the platform 22 to pick up or deposit an automobile on a stall to the left of the platform, the carrier motor 51 (FIG. 13) is driven to move the quill 44 and carrier 23 to the left, the carrier moving to the left relative to the quill. The arms 32 (FIG. 4) first are extended to engage the near wheels, at which time the crab 28 travels sufficiently far that the arms 36 are beyond the far wheels. The carrier motor 51 then is stopped, and the arms 36 are extended. The crab is driven back toward the crab 24 until the arms 36 engage the far sides of the far wheels of the automobile. Then the arms 30 and 38 are extended, the lift rollers are moved to lift the carrier and the automobile and the carrier motor 51 (FIG. 13) is reversed to bring the carrier and automobile onto the platform 20.

The reach or throw of the carrier 23 from the platform 20 is slightly greater than the length of the longest automobile to be parked, and the trackway 42 positively guides the quill 44 during movement of the quill 44 to and from the platform while the rollers 82 and the longitudinal angle iron members 72 guide the crabs 24 and 28 relative to the quill as the crabs and the cage 26 are extended relative to the quill and are retracted relative thereto.

If desired the platform 20 and the quill 44 may be lengthened and the chain drive thereof modified accordingly to extend the carrier 23 a full automobile length from the platform so that each stall may be of a depth of two automobile lengths. Thus, with stalls on each side of the platform, four automobiles may be parked in each aligned pair of stalls.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a parking apparatus,
a first inverted channel-like crab having lifting roller means and also provided with opposed pairs of cradle arms,
a second inverted channel-like crab having lifting roller means and also provided with opposed pairs of cradle arms,
an inverted channel-like cage enclosing the top and upper side portions of the crabs,
guide means on the cage mounting the second crab for movement therealong,
drive means for moving the second crab toward and away from the first crab,
elongated quill means adapted to extend below and through the crabs for guiding the crabs,
and means for moving the cage and crabs as a unit telescopically relative to the quill means.
2. In a parking apparatus,
a first inverted channel-like crab having lifting roller means and also provided with opposed pairs of cradle arms,
a second inverted channel-like crab having lifting roller means and also provided with opposed pairs of cradle arms,
an inverted channel-like cage enclosing the top and upper side portions of the crabs,
means fixing the first crab to the cage at one end of the cage,
drive means coupling the second crab to the cage for movement of the second crab toward and away from the first crab,
elongated quill means adapted to extend below and through the crabs for guiding the crabs,
and means for moving the cage and crabs as a unit telescopically relative to the quill means.
3. In a parking apparatus,
an elevator platform,
a quill having bottom rollers and movable between a retracted position supported solely by the platform and an extended position partly on the platform and partly on a floor of a parking stall,
a first crab frame having a bottom channel therethrough adapted to fit over the quill, a second crab frame having a bottom channel therethrough adapted to fit over the quill,
a channel-like cage fitting over the crab frames,
means fixing the first crab frame to the cage,
guide means mounting the second crab frame slidably along the cage,
lead screw means carried by the cage in a position extending therealong,
nut means fixed to the second crab frame and threadedly engaging the lead screw means,
motor means carried by the cage for rotating the lead screw means to move the second crab frame along the cage,
opposed pairs of cradle arm means carried by the first crab frame,
opposed pairs of cradle arm means carried by the second crab frame,
lift rollers carried by the first crab frame,
lift rollers carried by the second crab frame,
and drive means for moving the quill relative to the elevator platform and the cage telescopically relative to the quill.

4. In a parking apparatus,
an elevator platform,
a quill having bottom rollers and movable between a retracted position supported solely by the platform and an extended position partly on the platform and partly on a floor of a parking stall,
the quill also having side guide rollers extending laterally beyond the sides thereof,
a first crab frame having a bottom channel therethrough adapted to fit over the quill,
a second crab frame having a bottom channel therethrough adapted to fit over the quill,
a channel-like cage fitting over the crab frames,
means fixing the first crab frame to the cage,
guide means mounting the second crab frame slidably along the cage,
a pair of lead screws carried by the cage in positions extending therealong,
a pair of nuts fixed to the second crab frame and threadedly engaging the lead screws,
motor means carried by the cage for rotating the lead screws to move the second crab frame along the cage,
opposed pairs of cradle arm means carried by the first crab frame,
opposed pairs of cradle arm means carried by the second crab frame,
lift rollers carried by the first crab frame,
lift rollers carried by the second crab frame,
drive means for moving the quill relative to the elevator platform and the cage telescopically relative to the quill,
and control means for selectively operating the motor means and the drive means simultaneously and singly.

5. In a carrier for a parking apparatus,
an elongated, inverted channel,
a first crab in one end portion of the channel and fixed against movement relative to the channel,
a second crab in the other end portion of the channel and movable along the channel,
elongated guide rails fixed to the inner faces of the flanges of the channel,
elongated guide shoes on the sides of the second crab engaging and positioned above the guide rails,
and means for moving the second crab along the channel.

6. In a parking apparatus,
a first inverted channel-like crab having lifting roller means and also provided with opposed pairs of cradle arms,
a second inverted channel-like crab having lifting roller means and also provided with opposed pairs of cradle arms,
a cage enclosing the top and upper side portions of the crabs,
guide means on the cage mounting the second crab for movement therealong,
drive means for moving the second crab toward and away from the first crab,
elongated quill means adapted to extend below and through the crabs for guiding the crabs,
and means for moving the cage and crabs as a unit telescopically relative to the quill means.

7. In a parking apparatus,
an elevator platform,
a quill having bottom rollers and movable between a retracted position supported solely by the platform and an extended position partly on the platform and partly on a floor of a parking stall,
a first crab frame having a bottom channel therethrough adapted to fit over the quill,
a second crab frame having a bottom channel therethrough adapted to fit over the quill,
a channel-like cage fitting over the crab frames,
means fixing the first crab frame to the cage,
guide means mounting the second crab frame slidably along the cage,
drive means for moving the second crab frame along the cage,
motor means carried by the cage for driving the drive means to move the second crab frame along the cage,
opposed pairs of cradle arm means carried by the first crab frame,
opposed pairs of cradle arm means carried by the second crab frame,
lift rollers carried by the first crab frame,
lift rollers carried by the second crab frame,
and drive means for moving the quill relative to the elevator platform and the cage telescopically relative to the quill.

8. In a parking apparatus,
an elongated frame,
a plurality of cradle arms mounted on the frame at opposite sides thereof,
means on the frame for moving the cradle arms between retracted and extended positions,
a plurality of lift rollers,
a plurality of bellcrank mechanisms mounting the lift rollers at opposite sides of the frame at spaced points therealong for raising and lowering the frame relative to the rollers,
a pair of actuating bars mounted on the frame at opposite sides thereof for pivoting the bellcrank mechanisms,
and fluid pressure cylinder means mounted on the frame and coupled to the actuating levers for moving the actuating bars, said cylinder means including a pair of cylinder devices including pistons and mounted on the frame at opposite sides thereof in longitudinal alignment with the actuating bars, the coupling means serving to directly connect the actuating bars to the pistons.

References Cited by the Examiner
UNITED STATES PATENTS

| | | |
|---|---|---|
| 2,801,011 | 7/1957 | Overlach et al. |
| 2,916,166 | 12/1959 | Bigler. |
| 3,011,660 | 12/1961 | Shutt. |

GERALD M. FORLENZA, *Primary Examiner.*

R. B. JOHNSON, *Assistant Examiner.*